Feb. 28, 1928.  
H. DOCK  
1,661,033  
METHOD OF AND MEANS FOR DISPLAYING A FIXED PICTURE IN CONJUNCTION WITH A SERIES OF SYMBOLS FOR CONVEYING RELATED IDEAS  
Filed July 19, 1926  
3 Sheets-Sheet 1
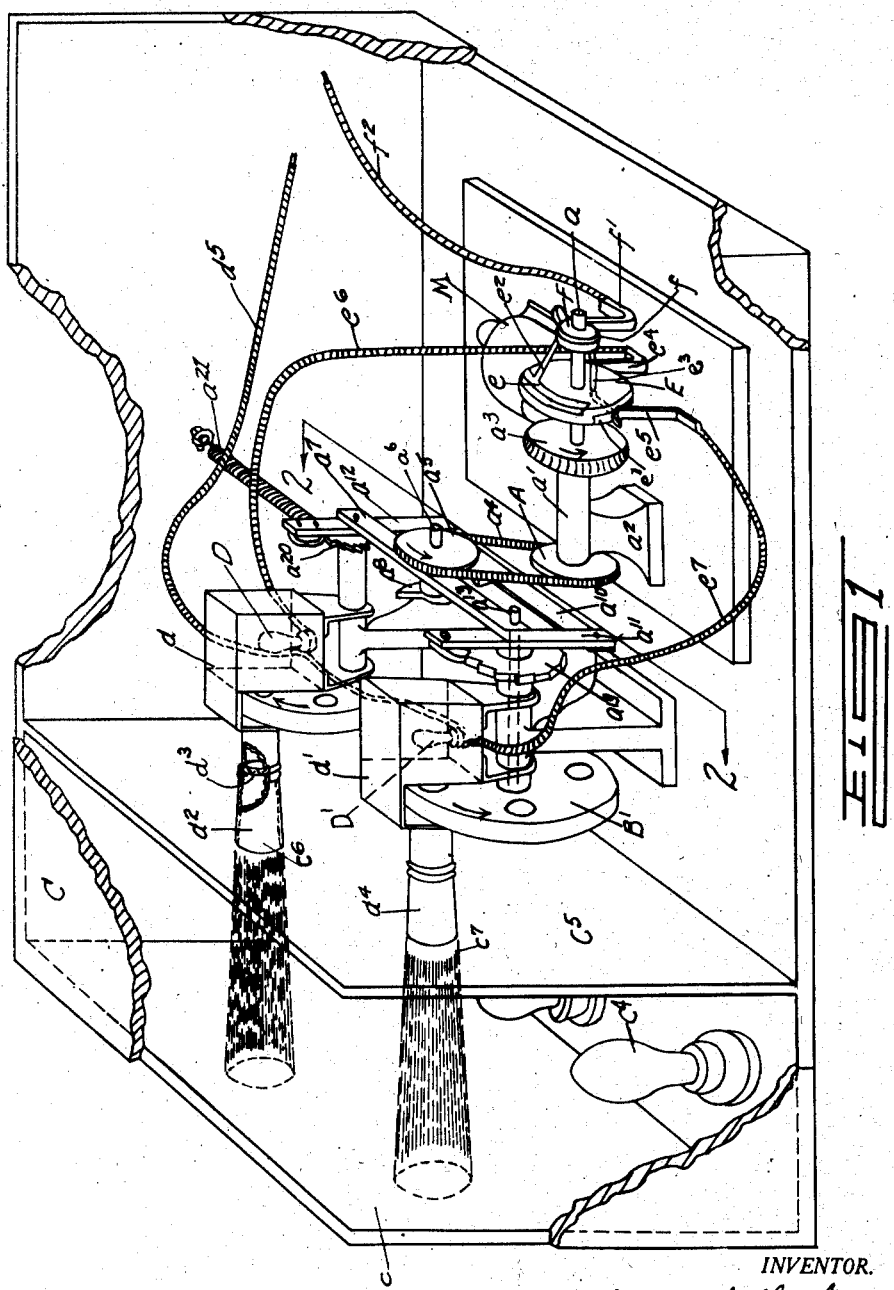
INVENTOR.  
Howard Dock  
BY  
Walter A. Knight  
his ATTORNEY Feb. 28, 1928.
H. DOCK
1,661,033
METHOD OF AND MEANS FOR DISPLAYING A FIXED PICTURE IN CONJUNCTION WITH
A SERIES OF SYMBOLS FOR CONVEYING RELATED IDEAS
Filed July 19, 1926    3 Sheets-Sheet 2
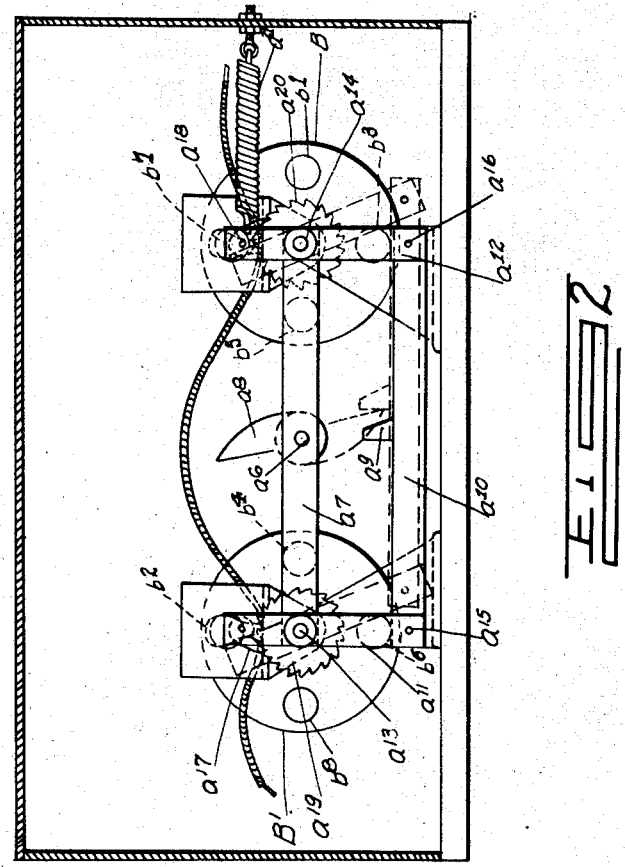
INVENTOR
Howard Dock
BY
Walter A. Knight
his ATTORNEY Feb. 28, 1928.
H. DOCK
1,661,033
METHOD OF AND MEANS FOR DISPLAYING A FIXED PICTURE IN CONJUNCTION WITH A SERIES OF SYMBOLS FOR CONVEYING RELATED IDEAS
Filed July 19, 1926  3 Sheets-Sheet 3
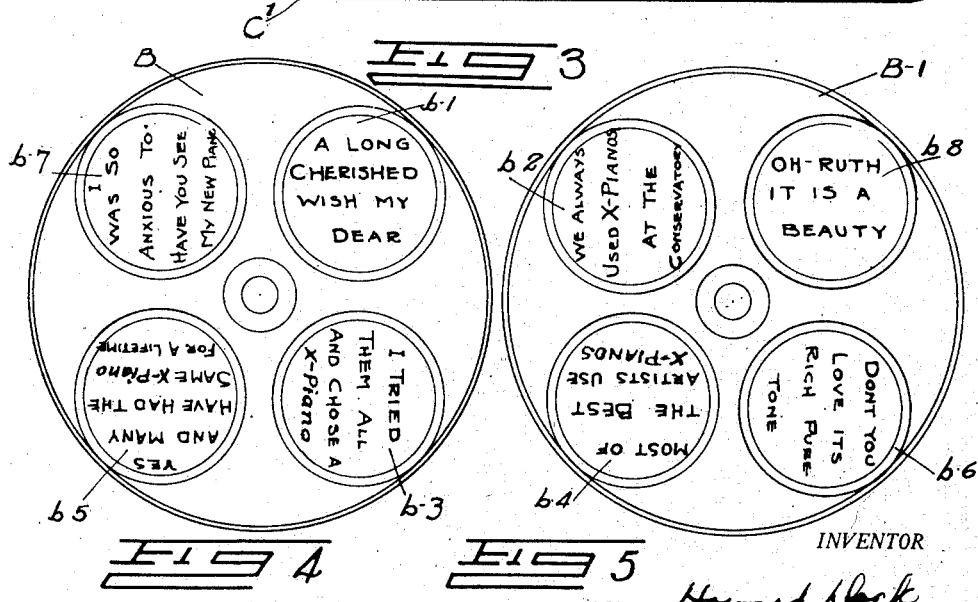
INVENTOR
BY Howard Dock
Walter A. Knight
his ATTORNEY.

Patented Feb. 28, 1928.

1,661,033

UNITED STATES PATENT OFFICE.

HOWARD DOCK, OF CINCINNATI, OHIO.

METHOD OF AND MEANS FOR DISPLAYING A FIXED PICTURE IN CONJUNCTION WITH A SERIES OF SYMBOLS FOR CONVEYING RELATED IDEAS.

Application filed July 19, 1926. Serial No. 123,522.

My invention relates to improvements in pictorial representations, and particularly to means for showing the several parts of a conversation in combination with a picture.

It is frequently difficult to arrest the attention and convey the thought desired in a picture unaided by reading matter. My principal object is to combine an appropriate conversation with a picture in such a manner as to arrest and hold the interest of the observer and to consecutively convey the desired thoughts. Generally the parts of a conversation will appear one at a time, and in orderly sequence, and the conversation may be between two or more persons.

One looking at such a picture will take in at a glance the subject as a whole, will read each statement as it appears and his interest having been aroused, will continue to read until the conversation has been completed. If all the statements appeared at once even if space permitted, there would be nothing to arouse the curiosity and one looking at the picture would pass on without reading the statements. It must also be borne in mind that things that move attract the attention.

Another object of my invention is to bring such a combined picture and conversation within a relatively small space, and make its production possible at a reasonable cost.

My invention permits the conveying of a continuing thought as with strip cartoons, within the space of a single picture, and is therefore valuable for many purposes, particularly in advertising and as an educational medium.

In the particular embodiment of my invention selected for illustration:

Figure 1 is a perspective of an illuminated advertisement displaying apparatus in its cabinet, my means for projecting elements of a conversation separately and consecutively being shown in connection therewith, and parts of the cabinet being broken away to disclose the mechanism, Fig. 2, is a side elevation of the means for rotating the plate carriers, Fig. 3, is the illuminated advertising picture shown, with one element of the conversation displayed in connection therewith, the space where the elements of the conversation contributed by the other person being blank at that time, Fig. 4, is the plate carrier for the several elements of the conversation which appear to be contributed by one of the persons in the advertising picture, and Fig 5, is the plate carrier for the elements of the conversation of the other person.

Referring now to the drawings and particularly to Figs. 1 and 2, C is the cabinet in which the whole mechanism is housed. The front of the cabinet $c$ is made of glass, and on its back surface is mounted the picture $c^1$ shown in Fig. 3, the circles $c^2$, $c^3$ where the elements of the conversations are to appear being preferably a solid color in keeping with the picture as a whole. The picture $c^1$ is illuminated by means of the electric lights $c^4$. Back of the lights $c^4$ is a vertical partition $c^5$, with openings $c^6$, $c^7$ through which the image of the wording on the plates B, B¹, hereinafter described is projected.

Within the main chamber of the casing C back of the partition $c^5$ are located the plate carriers, B, B¹, the latter carrying the plates, $b^2$, $b^4$, $b^6$ and $b^8$ with elements of the contributions of Jane to the conversation and the former carrying the plates $b^1$, $b^3$, $b^5$ and $b^7$ with elements of the contributions of Ruth to the conversation.

The mechanism for rotating the plate carriers consists of a sprocket wheel A, fixed to the shaft $a$, journalled in the bearing $a^1$ mounted on the support $a^2$. The shaft $a$ has a worm wheel $a^3$, driven by the motor M.

The sprocket wheel A has a chain $a^4$ which drives the sprocket wheel $a^5$, fixed to the shaft $a^6$ which is journalled in the cross piece $a^7$.

Fixed to the shaft $a^6$ is a rotating finger $a^8$ adapted to contact with lug $a^9$, on the bar $a^{10}$, which is parallel with bar $a^7$, thus moving the bar $a^{10}$ to the right as shown in dotted lines, in Fig. 2. An upstanding bar $a^{11}$ is pivoted toward its middle on shaft $a^{13}$ along with bar $a^7$, at its bottom is secured by pivot $a^{15}$ to bar $a^{10}$, and at its top carries a pawl $a^{17}$ which is adapted to coact with the teeth of ratchet wheel $a^{19}$ fixed to shaft $a^{18}$, to rotate said shaft, to the inner end of which the plate carrier B¹ is fixed. Similarly bar $a^{12}$ is pivoted toward its middle on shaft $a^{14}$, at its lower end is secured by pivot $a^{16}$ to bar $a^{10}$, and at its top carries a pawl $a^{18}$ which coacts with the teeth of ratchet wheel $a^{20}$ fixed to shaft $a^{14}$ to rotate said shaft, to the inner end of which the plate carrier B is fixed. A spring $a^{21}$ carries said bar $a^{10}$ from the extreme position to the right toward which it is tending as shown in dotted lines in Fig. 2, back to the position shown in full lines in said figure as soon as the finger $a^8$ (see dotted lines of same and its lug Fig. 2) passes over the top of the lug $a^9$ in its counter-clockwise rotation.

Immediately back of the plate carriers B and B¹ are electric lights, D, D¹ respectively, each in a light tight casing $d$, $d^1$ respectively, D being directly back of the circle $c^2$ and D¹ directly back of $c^3$. Each of the plates $b^1$, $b^3$, $b^5$ and $b^7$ is adapted upon rotation of the plate B to be brought directly between the lamp D and the display space $c^2$, and a magic lantern lens $d^3$, in the tube $d^2$ is adapted to project a suitable enlargement of the matter on the aligned plate upon the display space $c^2$. Similarly each of the plates $b^2$, $b^4$, $b^6$ and $b^8$ is adapted upon rotation of the plate B¹ to be brought directly between the lamp D¹ and the display space $c^3$, and a magic lantern lens in the tube $d^4$, is adapted to project a suitable enlargement of the matter on the aligned plate upon the display space $c^3$.

The lights D and D¹ are lighted alternately and after the plate carriers have come to rest with a plate aligned. The switch for turning them on and off is provided on a revolving disc E of insulating material fixed to the shaft $a$. Disc E has arcs $e$, $e^1$ of brass or other conducting material on opposite edges of the periphery, and at opposite sides of the discs. The shaft $a$ also carries another disc F also of insulating material, and having a collar $f$ of brass or other conducting material. A permanent electric connection $e^2$ is established between $f$ and $e$ and another $e^3$ between $f$ and $e^1$. A brush $f^1$ with lead wire $f^2$ makes constant electrical connection with the collar $f$. Brush $e^4$ makes intermittent contact with $e$ and thru lead wire $e^6$ then lights lamp D, the lead wire $d^5$ a permanent connection completing the circuit.

Brush $e^5$ intermittently supplies current through lead wire $e^7$ to lamp D¹, lighting it, the circuit being completed through lead wire $d^5$.

The operation of the apparatus through one complete conversation is as follows:

Starting with no wording shown in either of the circles $c^2$ or $c^3$, although plates $b^1$ and $b^8$ are in position to be projected, both lights D, D¹ being unlighted because the brush $e^6$ is not in contact with the arc $e^1$ nor is the brush $e^4$ in contact with the arc $e$.

The motor M through worm gear $a^3$ causes the shaft $a$ to rotate. This drives the sprocket A, which through the sprocket chain $a^4$ drives the sprocket $a^5$, shaft $a^6$ and pawl $a^8$, the direction of rotation being shown by the arrows.

When the discs E and F have been rotated sufficiently to bring the brush $e^5$ into contact with its arc $e^1$, as shown in Fig. 1, the lamp D¹ will be lighted and the plate $b^8$ being in registering position in front of the lamp D¹, there will appear on the picture in the space $c^3$ the words, "Oh Ruth it is a beauty". A little further rotation of the shaft $a$ and its attached elements carries the arc $e^1$ out of contact with the brush $e^5$, and the light D¹ goes out. Space $c^3$ then becomes dark, leaving both spaces $c^2$ and $c^3$ dark for the moment.

A little further rotation of the shaft $a$, brings the arc $e$ into contact with the brush $e^4$, and lights the lamp D, and the plate $b^1$, being in registering position in front of the lamp D, there will appear on the picture in the space $c^2$, the words, "A long cherished wish my dear". A little further rotation of the shaft $a$ and its attached elements carries the arc $e$ out of contact with the brush $e^4$ and both spaces $c^2$ and $c^3$ are again dark.

At this time the rotation of the shaft $a^6$ has brought the finger $a^8$ to such a position with regard to the lug $a^9$ that the upright bar $a^{11}$ has been so inclined as to cause the ratchet pawl $a^{17}$, to contact with ratchet wheel $a^{19}$, and rotate it along with the plate carrier B¹, so that the plate $b^2$ registers with the lamp D¹, ready when said lamp is lighted to have its symbols projected onto the picture in space $c^3$. The finger $a^8$ then passes out of contact with the lug $a^9$ and the spring $a^{21}$ immediately carries all parts back to the position shown in full lines in Figs. 1 and 2, and in so doing the pawl $a^{18}$, contacting with ratchet wheel $a^{20}$ rotates it along with the plate carrier B so that the plate $b^3$ registers with the lamp D ready for display when said lamp is lighted.

Further rotation of the shaft $a$ as heretofore described lights lamp D¹ and in the space $c^3$ on the picture appears, "We always used X-pianos at the conservatory." Subsequent similar rotation produces the following effect on the picture; space $c^3$ becomes dark, and there later appears in space $c^2$ "I tried them all and chose an X-piano". The space $c^2$ then becomes dark and there later appears in space $c^3$, "Most of the best artists use X-pianos." Then space $c^3$ becomes dark and there later appears in space $c^2$, "Yes, and many have had the same X-piano for a lifetime". Then space $c^2$ becomes dark and there later appears in space $c^3$ "Don't you love its rich, pure tone." Then space $c^3$ becomes dark and then later appears in space $c^2$, "I was so anxious to have you see my new piano." This completes the cycle of elements of the conversation. Space $c^3$ becomes dark and the conversation is repeated.

I do not wish to be limited to the means shown, but claim as within the scope of my invention the method of producing a display consisting of a fixed picture in conjunction with a series of symbols to convey related ideas and any means for carrying my method of display into effect. By fixed picture I intend to include those pictures in which the effect of falling or rippling water or moving flames are shown.

I claim as my invention and desire to secure by Letters Patent of the United States:

1. A display apparatus having in combination; a cabinet within which the mechanism is mounted, a glass front for said cabinet, a translucent picture on said glass, means for lighting said translucent picture, a plurality of portions of said picture on which symbols may be projected, projecting means for each of said portions, a light for each said projecting means, a plate holder with separate groups of symbols, for each of said projecting means, means for bringing each of said groups of symbols into position to be projected, means for switching the lights of said projecting means on and off and means for coordinating said switching means and plate adjusting means so that said groups of symbols may be projected upon said picture in predetermined order.

2. A display apparatus having in combination a cabinet within which the mechanism is mounted, a glass front for said cabinet, a translucent picture on said glass, means within said cabinet for lighting said picture, a plurality of portions on said picture on which symbols may be projected, projecting means for each of said portions, a light for each said projecting means, a rotatable disc plate holder for each said projecting means with separate elements of a conversation each arranged in a group on said plate holder, means for rotating each of said discs to bring said groups one at a time, into position to be projected, means for switching the lights on said projecting means on and off, and means for coordinating said switching means and disc rotating means so that said elements of the conversation may be projected upon said picture in predetermined order.

3. A display apparatus having in combination; a cabinet within which the mechanism is mounted, a glass front for said cabinet, a translucent picture on said glass, means for lighting said translucent picture, a plurality of portions of said picture on which symbols may be projected, projecting means for each of said portions, means for alternately lighting each of said projecting means, a plate holder with separate groups of symbols, for each of said projecting means, means for bringing each of said groups of symbols into position to be projected, means for switching the lights of said projecting means on and off and means for coordinating said switching means and plate adjusting means so that said groups of symbols may be projected upon said picture in predetermined order.

4. A display apparatus having in combination a cabinet within which the mechanism is mounted, a glass front for said cabinet, a translucent picture on said glass, means within said cabinet for lighting said picture, a plurality of portions on said picture on which symbols may be projected, projecting means for each of said portions, a light for each said projecting means, a rotatable disc plate holder for each said projecting means with separate elements of a conversation each arranged in a group on said plate holder, means for rotating each of said discs to bring said groups one at a time, into position to be projected, mechanical means for intermittently lighting said projecting means, and means for coordinating said mechanical means and disc rotating means so that said elements of the conversation may be projected upon said picture in predetermined order.

5. An automatic display apparatus having in combination a cabinet within which the mechanism is mounted, a transparent front for said cabinet, a translucent picture on said front, means for lighting said translucent picture, a plurality of portions of said picture on which related wording may be projected, projecting means for each of said portions, means for alternately lighting each said projecting means, a rotatable plate holder with separate groups of related wording for each of said projecting means, means for bringing each of said groups of related wording into position to be projected, mechanical means for intermittently lighting said projecting means, and means for coordinating said mechanical means and plate adjusting means so that said groups of related wording may be projected upon said picture one at a time in predetermined order.

In testimony whereof I have hereunto set my hand.

HOWARD DOCK.